March 8, 1927.
H. M. WITHEROW
INDUCTION METER
Filed April 11, 1924
1,620,505
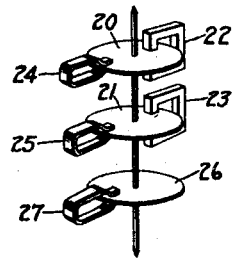
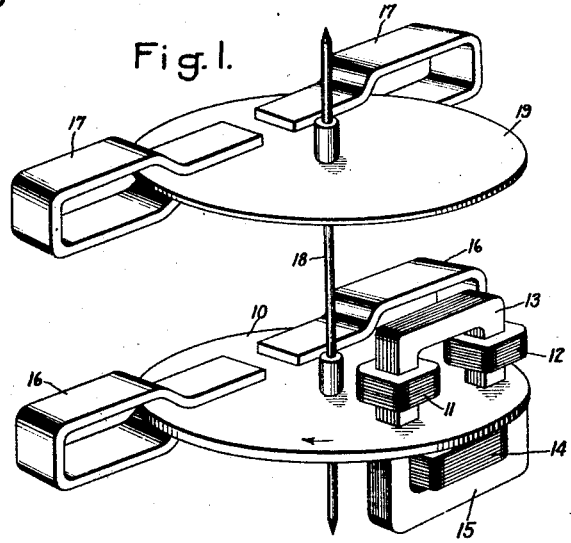
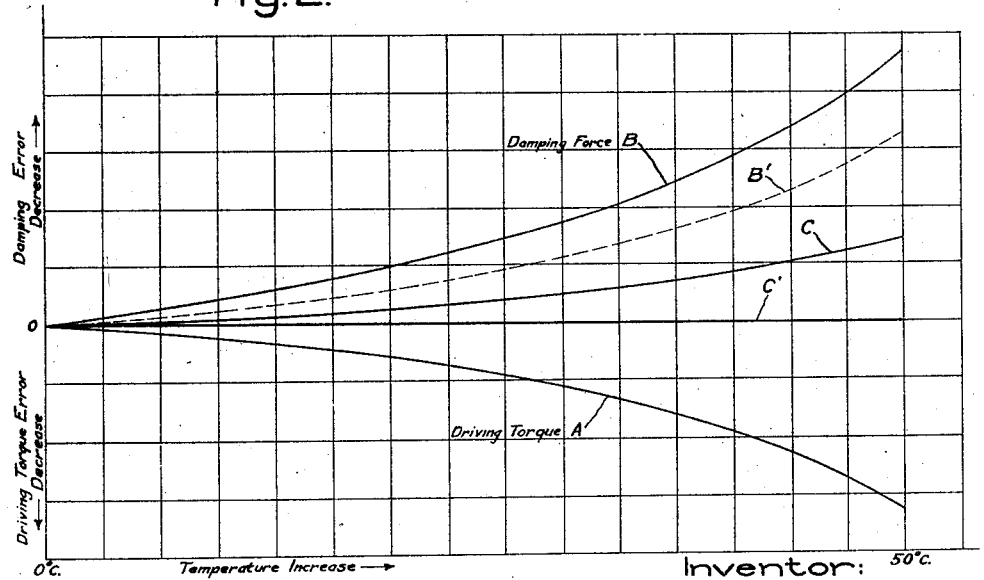
Inventor:
Harry M. Witherow,
by
His Attorney.

Patented Mar. 8, 1927.

1,620,505

UNITED STATES PATENT OFFICE.

HARRY M. WITHEROW, OF LYNN, MASSACHUSETTS, ASSIGNOR TO GENERAL ELECTRIC COMPANY, A CORPORATION OF NEW YORK.

INDUCTION METER.

Application filed April 11, 1924. Serial No. 705,902.

My invention relates to induction meters of the integrating type, such as watthour meters, and in particular to a novel arrangement for correcting for temperature errors in such meters.

In the induction type watthour meter, there are a number of factors which change with temperature. For example, there is a decrease in the driving torque and a decrease in the damping force with an increase in temperature due to the fact that the meter disc has a positive temperature coefficient of resistance which causes its resistance to increase with temperature increases. Also, there is an increase in the driving torque at and near unity power factor and a decrease in the damping force for increases in temperature due to flux changes in the driving magnet system and in the damping magnets. The reason for these flux changes is not clearly understood, but the fact remains that they do exist and must be taken into consideration if the meter is to give accurate results at different temperatures. While some of these errors tend to cancel each other, they vary with respect to each other in such a manner that there is a resultant error in the meter as usually constructed.

It is the main object of my invention to provide a meter in which these errors are so proportioned and made to vary with respect to each other, with changes in temperature, as to entirely cancel out at a given power factor. In carrying my invention into effect, I do not attempt to change the manner of variation of the separate errors themselves as they ordinarily exist in the usual meter, because to do so would tend to disturb well established principles of meter design and possibly introduce new errors. On the other hand, I provide an additional damping disc which is not acted upon by the driving flux and which, therefore, may be given any size and temperature coefficient desirable. Then I so proportion the magnitude of the damping effect and the temperature coefficient of this auxiliary damping disc as to compensate for the resultant error of the ordinary meter, the damping produced on the main disc by the usual damping magnet being decreased so that the total damping is of the required magnitude.

The features of my invention which I believe to be novel and patentable will be pointed out in the claims appended hereto.

For a better understanding of my invention, reference is made in the following description to the accompanying drawing, Fig. 1 of which represents the application of my invention to a single phase watthour meter; Fig. 2 represents, by means of curves, how the temperature errors of such a meter are compensated for; and Fig. 3 illustrates the application of my invention to a polyphase induction meter of the integrating type.

Referring now to Fig. 1, which shows the essential parts of a watthour meter built in accordance with my invention. The lower disc 10 is of the usual construction and cooperates with the usual watthour meter driving element comprising, in this case, the current coils 11 and 12 supported on the magnetic member 13 and the potential coil 14 mounted on the magnetic member 15. The magnetic members 13 and 15 are separated by an air gap in which is located the disc 10 and the fluxes of the magnets cooperate to produce rotation of the disc in accordance with well established principles. The disc 10 is made of aluminum or other conducting material suitable for its purpose. The damping magnets 16, cooperating with disc 10, are of usual construction, but their damping effect is made somewhat less than usual. The disc 10 is mounted on the rotatable shaft 18 and this shaft carries an auxiliary disc 19 of conducting material. The disc 19 is made of a material having a different temperature co-efficient from that of disc 10. The materials of which the two discs are made may be varied so long as their temperature coefficients are such as to compensate for temperature errors in the manner hereinafter explained. For the purpose of explaining my invention, the disc 19 will be considered as being made of brass with a temperature coefficient of .0015 and a specific resistance of 7.2 and the disc 10 will be considered as being made of aluminum having a temperature coefficient of .004 and a specific resistance of 2.66. Cooperating with disc 19 is a second set of drag magnets 17.

Referring now to Fig. 2, I have represented certain curves plotted with the abscissa represented as temperature rise over a range of 50 degrees centigrade and the ordinates as representing meter errors due to temperature change. Thus, if we assume a constant load on the meter, the driving torque decreases with a temperature increase as represented by the curve A. This is owing to the fact that the decrease in driving torque, due to the increase in the resistance of the disc, is greater than the increase in driving torque, due to the increase in the driving flux. The decrease in damping force, with increase in temperature, of a watthour meter provided with an aluminum disc as usually constructed may be represented by the curve B. These curves are plotted in different directions from the horizontal zero error line since they tend to cancel each other. If the damping error increases at a faster rate than the driving torque error as is usually the case, there will be a resultant meter error such as represented by the curve C. Thus, if the meter is accurate at zero degree centigrade, it will run fast at 50 degrees centigrade, other conditions remaining constant. The character of the curves thus far mentioned are typical of the errors existing in the usual watthour meter.

Now, in order to correct for the resultant error represented by the curve C, I provide a separate damping disc 19 and give it a temperature coefficient, in this case, less than that of disc 10. Instead of accomplishing all the damping on the aluminum disc, I divide the required damping force between the brass disc 19 and the aluminum disc 10 so that the total damping force, while being of the same magnitude as in the usual meter, has a temperature error equal to the temperature error in the driving torque over the temperature range for which the instrument is to be used. Thus, the resultant temperature error required to be produced by the damping force is represented by the dotted line B' which curve may be taken to indicate the resultant temperature error in the damping force produced on discs 10 and 19, which exactly cancels the driving torque error and produces a resultant driving force having a zero temperature error as represented by the horizontal line C'.

It will be understood that the damping produced on the aluminum disc 10 by the magnet 16 is not so great as would be the case in the usual meter where a single damping disc is used, since a portion of the damping is now supplied by the upper disc 19 and its damping magnets 17. It will also be understood that the proportions of the total damping force, which are supplied by discs 10 and 19, may be readily changed by adjusting the position of the damping magnets relative to their discs in the usual manner, and in this way the character of curve B' may be readily changed. For example, if it is desired to decrease the damping force temperature error, the damping produced on the brass disc 19 would be increased by moving the magnets 17 nearer to the periphery of the disc 19 and the damping produced on the aluminum disc 10 would be decreased by moving the magnets 16 in towards the shaft 18, keeping the magnitude of the total damping force substantially constant.

While I have specified brass and aluminum as the materials to be used in the two discs, I do not wish to be limited thereto as it will be evident that various other combinations of materials having the requisite temperature coefficients to produce the desired results may be used. In some special cases it may be found that an increase in the temperature error of the usual damping disc is required to produce a complete cancellation of the driving torque temperature error and in such cases the auxiliary damping disc should have a higher temperature coefficient of resistance than that of the main disc and I intend to cover such a combination in the broad claims of my invention.

Thus far the discussion has referred to a single phase meter, but it will be evident that the invention is equally applicable to polyphase meters. Thus, in Fig. 3 I have represented a polyphase meter having two driving discs 20 and 21, respectively provided with driving magnet systems 22 and 23 and damping magnet systems 24 and 25. Mounted on the same shaft with discs 20 and 21 is an auxiliary damping disc 26 and a cooperating drag magnet system 27 for correcting the resultant temperature error of the polyphase meter. Other arrangements for carrying out the invention will occur to those skilled in the art.

Because of the high accuracy desired in test meters and because such meters are carried from place to place and exposed to widely different temperatures, I have found the invention to be particularly useful in their construction.

In accordance with the provisions of the patent statutes, I have described the principle of operation of my invention, together with the apparatus which I now consider to represent the best embodiment thereof, but I desire to have it understood that the apparatus shown is only illustrative and that the invention can be carried out by other means.

What I claim as new and desire to secure by Letters Patent of the United States, is:

1. An integrating type meter comprising, in combination, driving means subject to a temperature error, and a plurality of damping means therefor, said damping means being subject to different temperature errors which are so proportioned as to compensate for the temperature error of the driving means.

2. An integrating wattmeter subject to a driving torque temperature error, said meter having a two-part damping means, said two parts being subject to different temperatures errors and proportioned to substantially compensate for the driving torque error of said meter.

3. An integrating type meter of the induction type provided with the usual induction disc and drag magnet systems which are subject to temperature errors, characterized by the provision of an auxiliary damping disc and cooperative drag magnet, said auxiliary disc having a temperature coefficient of resistance different from that of said usual disc system and supplying that portion of the total meter damping force necessary to compensate for said other meter temperature errors.

4. In an integrating meter of a type wherein a change in the driving force of the meter exists due to temperature changes, means for compensating for said error comprising a plurality of discs of conducting material driven by the meter, at least one of said discs having a temperature coefficient of resistance different from the remaining disc or discs, damping magnets cooperating with said discs for producing the required damping force of said meter, the damping forces produced by the several damping systems being so proportioned as to produce a resultant damping force having a temperature error equal and opposite to the driving force temperature error at any operating temperature.

5. An induction disc watthour meter having a rotating part comprising one or more aluminum discs acted upon by a driving element and a damping element of the meter, and a brass disc acted upon by a damping element only.

6. An induction disc integrating type meter having a rotating part comprising one or more discs of conducting material acted upon by a driving element and a damping element of the meter, and an auxiliary disc having an appreciable, but smaller temperature coefficient of resistance than the other disc or discs acted upon by a damping element only.

7. An induction disc watthour meter having a rotating part comprising one or more discs of conducting material acted upon by a driving element and a damping element of said meter, and an auxiliary disc acted upon by a damping element only, the ratio of the temperature coefficient of resistance of said auxiliary disc to that of the other disc or discs being in the neghborhood of 3/8.

In witness whereof, I have hereunto set my hand this 8th day of April, 1924.

HARRY M. WITHEROW.